US006748122B1

(12) United States Patent
Ihara et al.

(10) Patent No.: US 6,748,122 B1
(45) Date of Patent: Jun. 8, 2004

(54) IMAGE PROCESSING APPARATUS, IMAGE PROCESSING METHOD AND IMAGE PROCESSING PROGRAM STORAGE MEDIUM

(75) Inventors: Keigo Ihara, Chiba (JP); Toru Konishi, Kanagawa (JP); Junichi Rekimoto, Tokyo (JP); Takahiko Sueyoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/385,755

(22) Filed: Aug. 30, 1999

(30) Foreign Application Priority Data

Aug. 31, 1998 (JP) .......................................... 10-245856

(51) Int. Cl.[7] ................................................ G06K 9/54
(52) U.S. Cl. ...................... 382/306; 382/183; 382/284; 235/462.11; 345/629
(58) Field of Search ................................. 382/100–102, 382/137–138, 140, 181–183, 237, 305, 306, 312, 313, 151, 284, 291, 292; 235/375, 462.01, 462.02, 462.11, 462.15, 462.45, 472.01, 472.02, 487; 705/21, 23, 26, 27; 707/10; 709/217, 218; 345/619, 629

(56) References Cited

U.S. PATENT DOCUMENTS

| 4,450,579 A | * | 5/1984 | Nakashima et al. ......... 382/151 |
| 5,038,392 A | * | 8/1991 | Morris et al. ................ 382/175 |
| 5,258,855 A | * | 11/1993 | Lech et al. ................... 358/462 |
| 5,304,787 A | * | 4/1994 | Wang ..................... 235/462.09 |
| 5,499,108 A | * | 3/1996 | Cotte et al. .................. 358/400 |
| 5,606,374 A | * | 2/1997 | Bertram ......................... 725/37 |
| 5,848,202 A | * | 12/1998 | D'Eri, et al. ................. 382/306 |
| 5,929,849 A | * | 7/1999 | Kikinis .......................... 345/327 |
| 5,938,727 A | * | 8/1999 | Ikeda ............................ 709/218 |
| 5,978,773 A | * | 11/1999 | Hudetz et al. ................. 705/23 |
| 6,011,546 A | * | 1/2000 | Bertram ....................... 345/700 |
| 6,027,024 A | * | 2/2000 | Knowles ................. 235/472.01 |
| 6,036,094 A | * | 3/2000 | Goldman et al. ....... 235/462.45 |
| 6,108,656 A | * | 8/2000 | Durst et al. .................... 707/10 |
| 6,199,048 B1 | * | 3/2001 | Hudetz et al. ................. 705/23 |

FOREIGN PATENT DOCUMENTS

| EP | 0 587 138 | 3/1994 |
| EP | 0 622 722 | 11/1994 |
| EP | 0 827 337 | 3/1998 |
| WO | WO 97 01137 | 1/1997 |
| WO | WO 98 13745 | 4/1998 |

OTHER PUBLICATIONS

Patent Abstracts of Japan vol. 1996, No. 8, Aug. 30, 1996 & JP 08 106372 A (IBM Japan Ltd), Apr. 23, 1996.

* cited by examiner

Primary Examiner—Daniel Mariam
(74) Attorney, Agent, or Firm—Frommer Lawrence & Haug LLP; William S. Frommer; Samuel H. Megerditchian (57) ABSTRACT

Disclosed is an image processing apparatus comprising: an image acquiring element for acquiring an object image; a displaying element for displaying the object image acquired by the image acquiring element; a captured position information recognizing element for capturing a predetermined image pattern from within the object image acquired by the image acquiring element in order to recognize position information about the image pattern relative to the object image; a menu display controlling element for displaying a menu image in overlaid relation to the object image displayed by the displaying element in accordance with an outcome of the recognition by the captured position information recognizing element; and a starting element for starting a previously related process based on the menu image displayed by the menu display controlling element as well as on the position information recognized by the captured position information recognizing element.

6 Claims, 12 Drawing Sheets

IMAGE PROCESSING APPARATUS, IMAGE PROCESSING METHOD AND IMAGE PROCESSING PROGRAM STORAGE MEDIUM

BACKGROUND OF THE INVENTION

The present invention relates to an image processing apparatus, an image processing method, and an image processing program storage medium for facilitating diverse input operations such as selection of a menu and starting of an application program.

Recent years have witnessed widespread use of personal computer operating systems such as Windows 95 (registered trademark) and Windows 98 (registered trademark), both from Microsoft Corporation in the United States. Such operating systems offer on a display screen various task bars with indications visible to users such as buttons representing applications each having an active window.

A technique dealing with the use of the task bar is disclosed in detail by Japanese Published Unexamined Patent Application No. Hei 8-255066. Below is an excerpt from the cited patent application.

Illustratively, the task bar includes buttons that inform a user which tasks are currently active. The task bar may also include a start menu button comprising menu items that allow the user to activate desired programs, open documents and gain access to a menu of system settings.

In a typical computer system including a central processing unit (CPU) and such peripherals as a mouse, a keyboard and a video display, the start menu button on the task bar is used illustratively as follows: the start menu button is operated by the user to open the start menu for gaining access to programs, documents, system controls and help information. Initially, the user points a mouse cursor to the start menu button and clicks a left mouse button. The actions cause the start menu to appear.

The start menu typically includes such menu items as programs, search, setting and help. The "programs" menu item when selected allows the user to access a program menu displayed hierarchically from the start menu. The program menu displays a plurality of application programs and a group of programs that may be selected by the user.

The trouble is that the user is required repeatedly to perform complicated actions when selecting and activating a desired application program from the task bar comprising the start menu button.

Specifically, the user first points the mouse cursor to the start menu button on the task bar and clicks the left mouse button to display the start menu. Next, the user points the mouse cursor to the "programs" menu item in the start menu and clicks the left mouse button to display the program menu. The user then points the mouse cursor to an indication of the desired application program in the program menu, and again clicks the left mouse button. Another series of point and click actions is needed if there is an application program group. Finally the CPU activates the selected application program.

The user is required conventionally to repeat such complicated actions before starting the desired application program. In particular, if the user is already handling some other chores with one hand, operating the pointing device with the other hand often turns out to be a difficult task from a user interface point of view. The same difficulty is encountered when other menu items such as "help" are clicked from the start menu program for desired processing.

Meanwhile, the so-called bar code system is used extensively today in various industrial fields. The system involves encoding in bars alphanumeric characters representing identification numbers and other information about goods and articles, and attaching such codes to the goods and products so that their identification information may later be scanned and retrieved by an optical recognition apparatus called a bar code scanner. The bar code system, used primarily at cash registers or like equipment in retail stores, allows bar codes on sold products to be optically scanned so as to acquire their identification numbers. The acquired identification numbers are used as a basis for retrieving previously stored prices of the corresponding products from a database, and the retrieved prices are displayed on a display part at the cashiers' counter.

The bar code system has so far been utilized only as a means for alleviating the burden of cashiers entering product identification numbers through key operations. As such, the code system has not been used for bypassing the chores of computer input operations such as menu selections when a desired program is to be activated selectively from among application programs stored beforehand on a hard disk drive (HDD) of a general purpose personal computer.

SUMMARY OF THE INVENTION

It is therefore an object of the present invention to provide an image processing apparatus, an image processing method, and an image processing program storage medium for facilitating diverse input operations such as selection of a menu and starting of an application program, wherein a user simply presenting a computer with a menu selection card with a suitable two-dimensional code printed thereon causes the position of the code to be captured so that remote operations such as menu selection and application program activation are carried out according to information on the captured position.

In carrying out the invention and according to one aspect thereof as defined in the appended claim 1, there is provided an image processing apparatus comprising: image acquiring means for acquiring an object image; displaying means for displaying the object image acquired by the image acquiring means; captured position information recognizing means for capturing a predetermined image pattern from within the object image acquired by the image acquiring means in order to recognize position information about the image pattern relative to the object image; menu display controlling means for displaying a menu image in overlaid relation to the object image displayed by the displaying means in accordance with an outcome of the recognition by the captured position information recognizing means; and starting means for starting a previously related process based on the menu image displayed by the menu display controlling means as well as on the position information recognized by the captured position information recognizing means.

According to another aspect of the invention as defined in the appended claim 5, there is provided an image processing method comprising the steps of: acquiring an object image; displaying the object image acquired in the image acquiring step; recognizing position information about a predetermined image pattern relative to the object image by capturing the image pattern from within the object image acquired in the image acquiring step; controlling display of a menu image in overlaid relation to the object image displayed in the displaying step in accordance with an outcome of the recognition in the captured position information recognizing step; and starting a previously related process based on the menu image displayed by the menu display controlling step as well as on the position information recognized in the captured position information recognizing step.

According to a further aspect of the invention as defined in the appended claim 6, there is provided an image processing program storage medium for storing an image processing program in a manner executable by a computer, the image processing program comprising the steps of: acquiring an object image; displaying the object image acquired in the image acquiring step; recognizing position information about a predetermined image pattern relative to the object image by capturing the image pattern from within the object image acquired in the image acquiring step; controlling display of a menu image in overlaid relation to the object image displayed in the displaying step in accordance with an outcome of the recognition in the captured position information recognizing step; and starting a previously related process based on the menu image displayed by the menu display controlling step as well as on the position information recognized in the captured position information recognizing step.

Through the use of the inventive image processing apparatus, image processing method, and image processing program storage medium outlined above, a predetermined image pattern is first captured from an acquired object image. Position information about the captured image pattern relative to the object image is then recognized. A menu image is displayed on the basis of the captured position information, and a previously related process is started accordingly.

Other objects, features and advantages of the invention will become more apparent upon a reading of the following description and appended drawings.

DETAILED DESCRIPTION OF THE PREFERRED EMBODIMENTS

Preferred embodiments of this invention will now be described with reference to the accompanying drawings.

Figure 1:
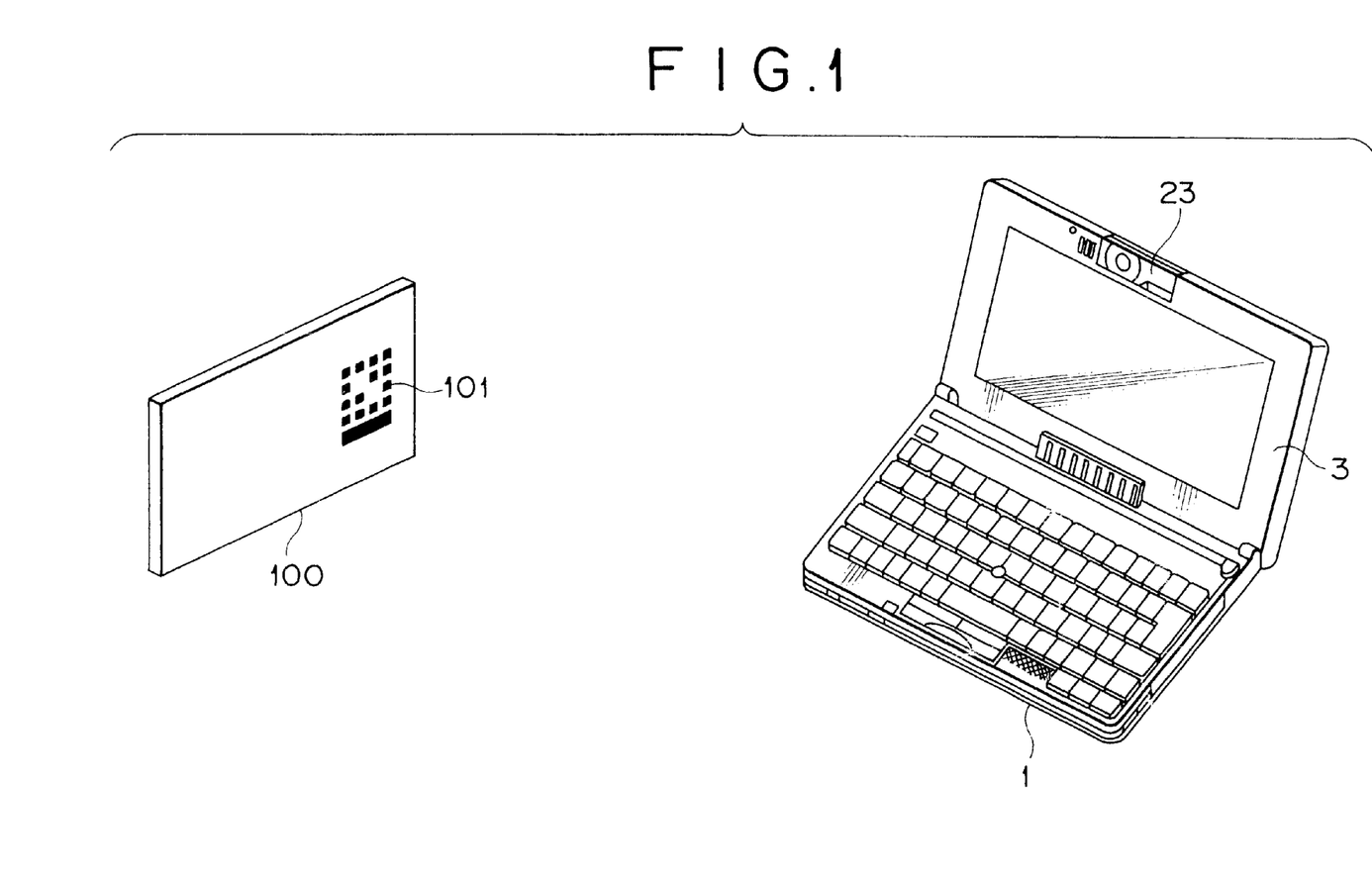
FIG. 1 is a schematic view showing a use example of a personal computer 1 to which the invention is applied.

FIG. 1 is a schematic view showing a use example of a personal computer 1 to which the invention is applied. In this example, a two-dimensional code 101 of a predetermined pattern is printed onto a menu selection card 100, or a label on which the two-dimensional code 101 is printed is attached to the card 100. The two-dimensional code 101 may be simply referred to as the 2D code hereunder where appropriate.

Figure 2:
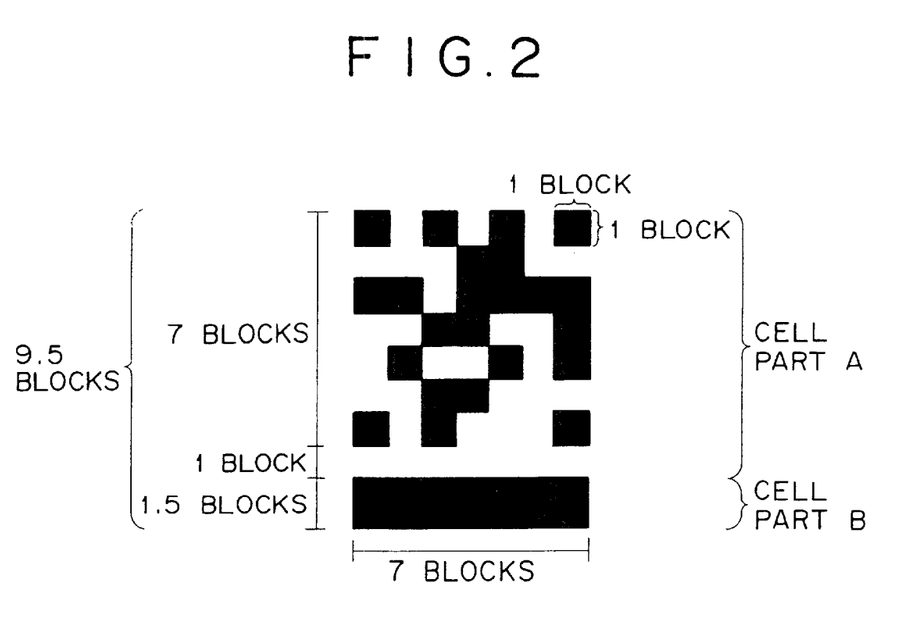
FIG. 2 is an explanatory view depicting specifications of a two-dimensional code.

As shown in FIG. 2, the 2D code 101 constitutes a block unit-based rectangle measuring 9.5 blocks by 7 blocks. The rectangle comprises a cell part A and a logo part B, in black, separated by a single block space. The cell part A forms a square of 7 blocks per side comprising square cells arranged in a two-dimensional pattern. The logo part B includes a large-sized rectangle measuring 1.5 blocks by 7 blocks. Illustratively, the logo part B has a logo mark such as CyberCode (registered trademark) printed in blanks against a black background representing the code system name of the 2D code 101.

"What we call "CyberCode" is Sony's unique two-dimensional code system that offers about 16.77 million different patterns (in 24 bits). Of these patterns, about one million patterns (in 20 bits) may be registered as desired for program start-up purposes. The remaining code patterns are reserved for future service expansion. "CyberCode" works as an index to what is represented by the code in question, the index allowing relevant information to be retrieved from computer storage. When a user starts a program through a new interface feature "CyberCode Finder", the user finds that the corresponding information leaps from the object having the "CyberCode" onto the computer screen."

The personal computer 1 is a notebook type computer comprising a CCD video camera 23 located in a display part 3. Illustratively, the personal computer 1 recognizes a pattern of the 2D code 101 on the basis of image data about the object 100 and 2D code 101, the image data being acquired by the CCD video camera 23. The personal computer 1 performs a process in accordance with the pattern of the 2D code 101 thus obtained.

Figure 3:
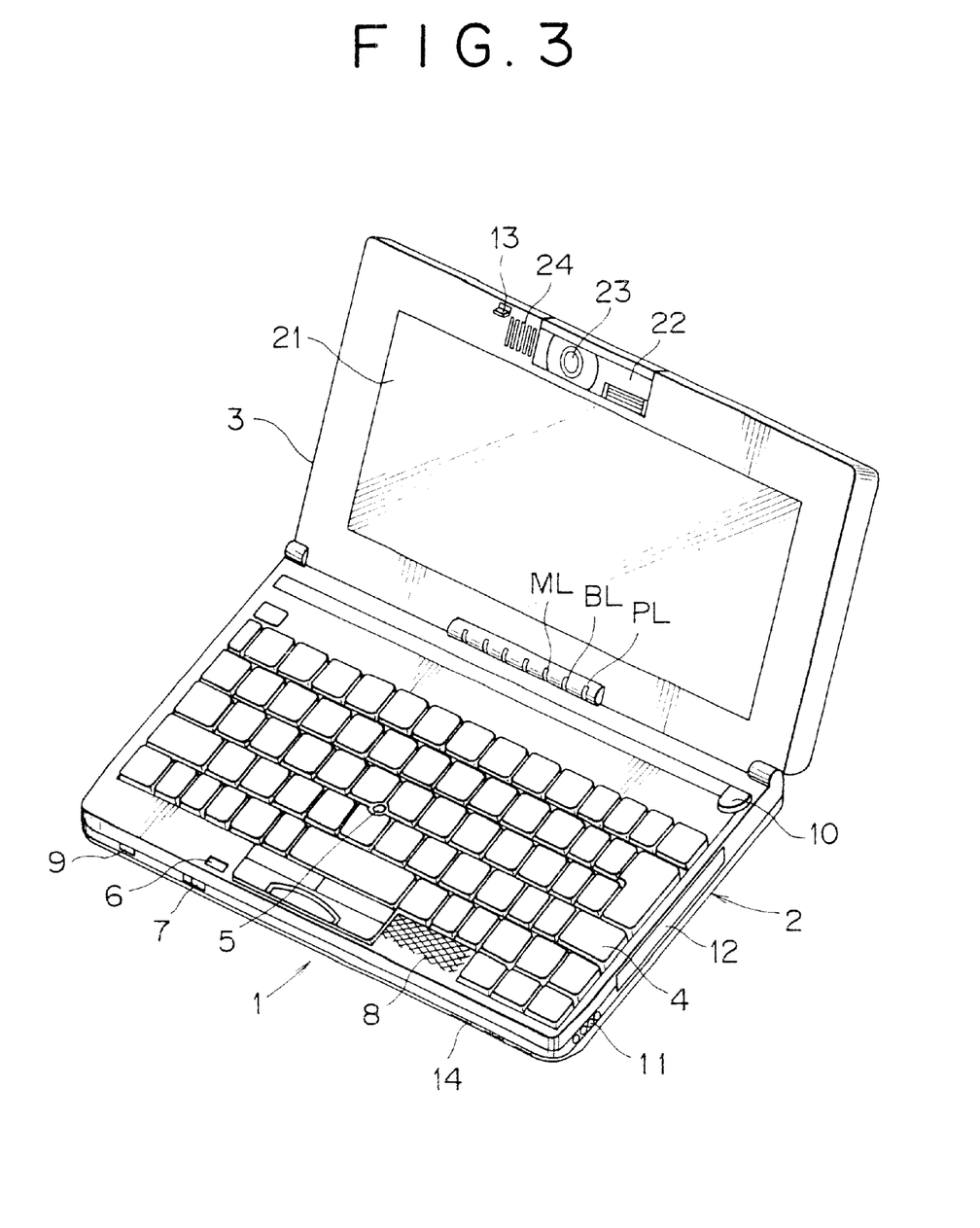
FIG. 3 is a perspective view of a portable personal computer embodying the invention, with its display part swung open away from its body.
Figure 4:
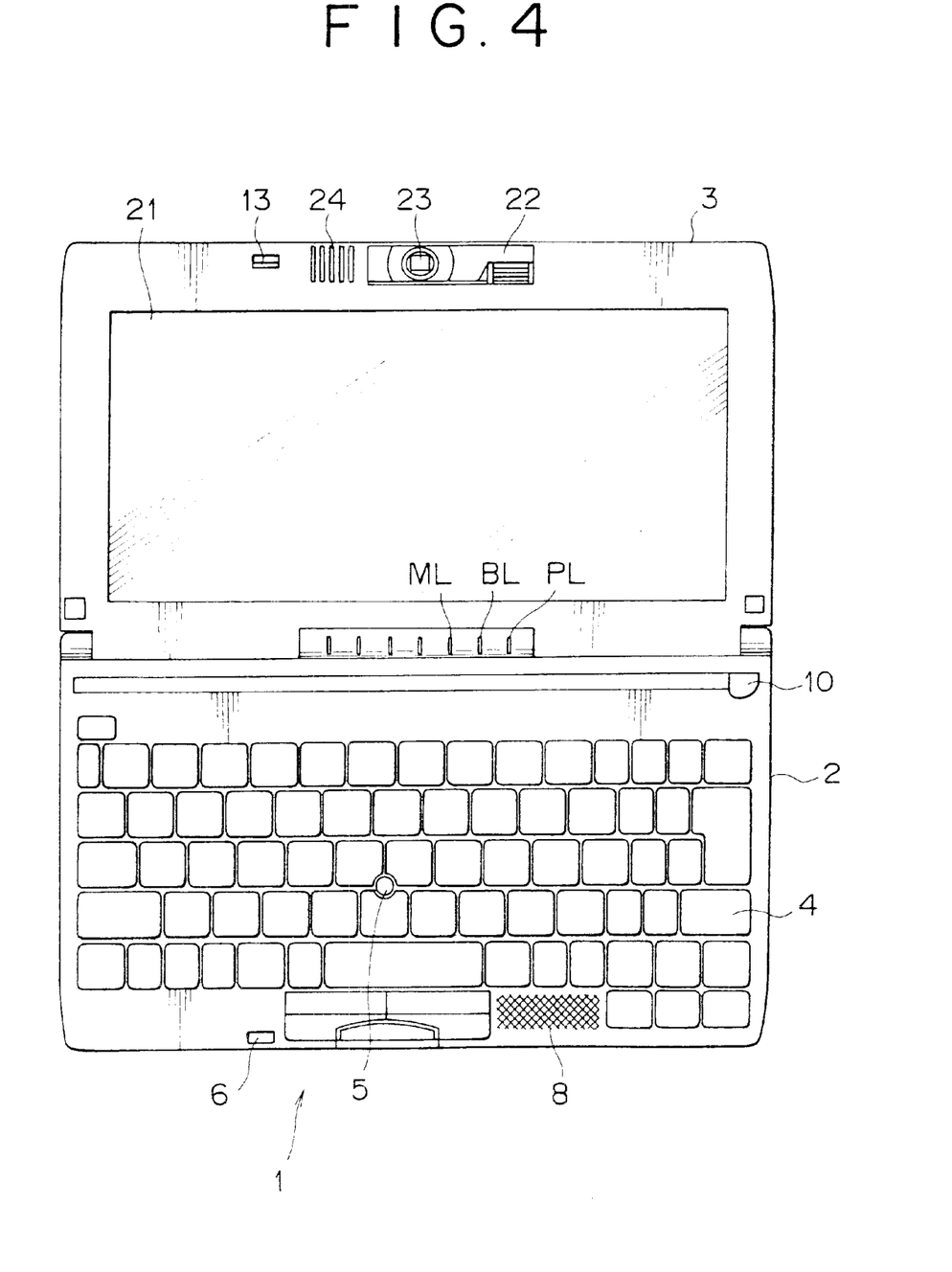
FIG. 4 is a plan view of the computer in FIG. 3.
Figure 5:
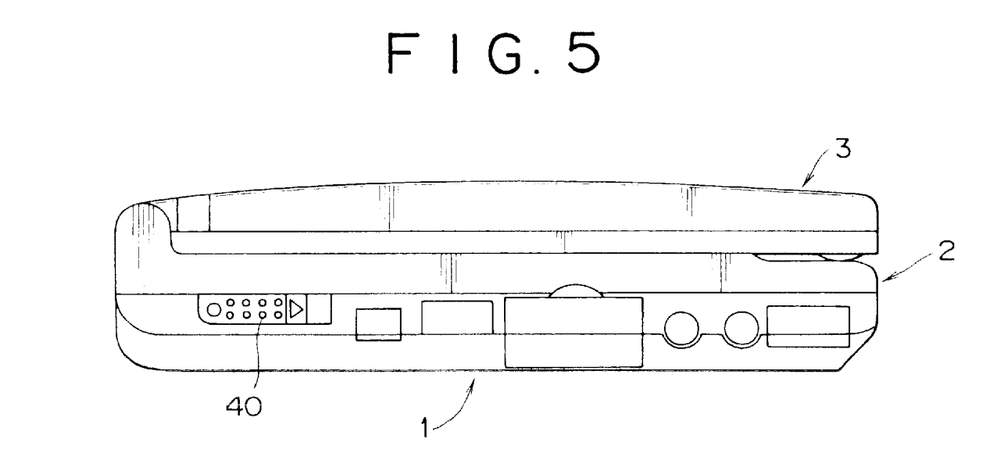
FIG. 5 is a left-hand side view of the computer in FIG. 3 with its display part swung shut onto its body.
Figure 6:
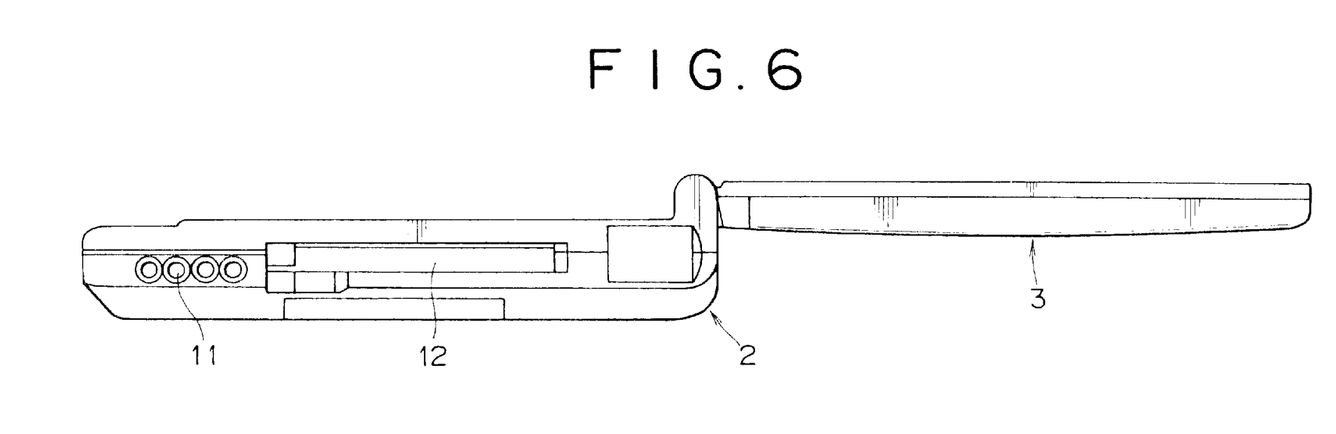
FIG. 6 is a right-hand side view of the computer in FIG. 3 with its display part swung open 180 degrees relative to its body.
Figure 7:
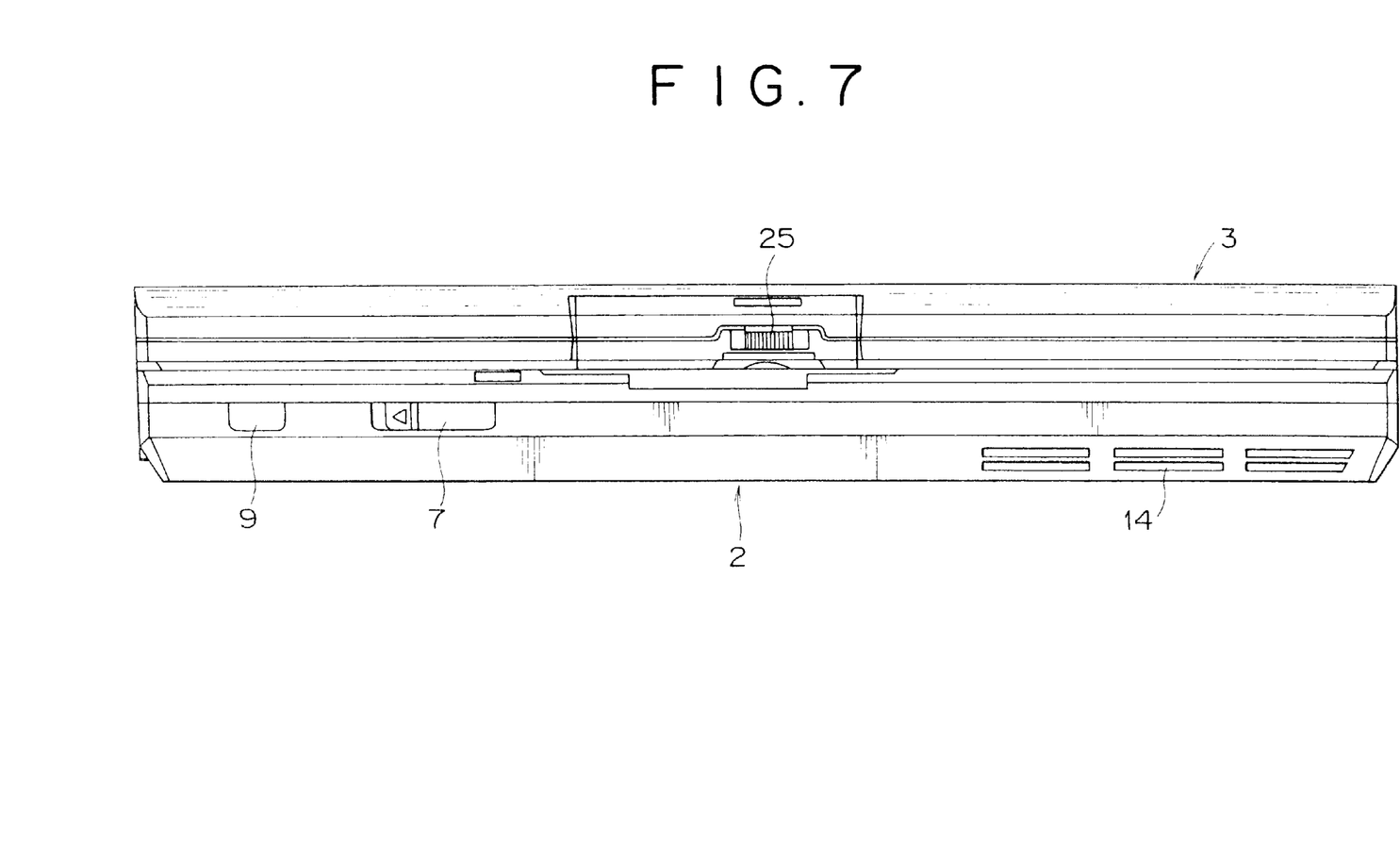
FIG. 7 is a front view of the computer in FIG. 5.
Figure 8:
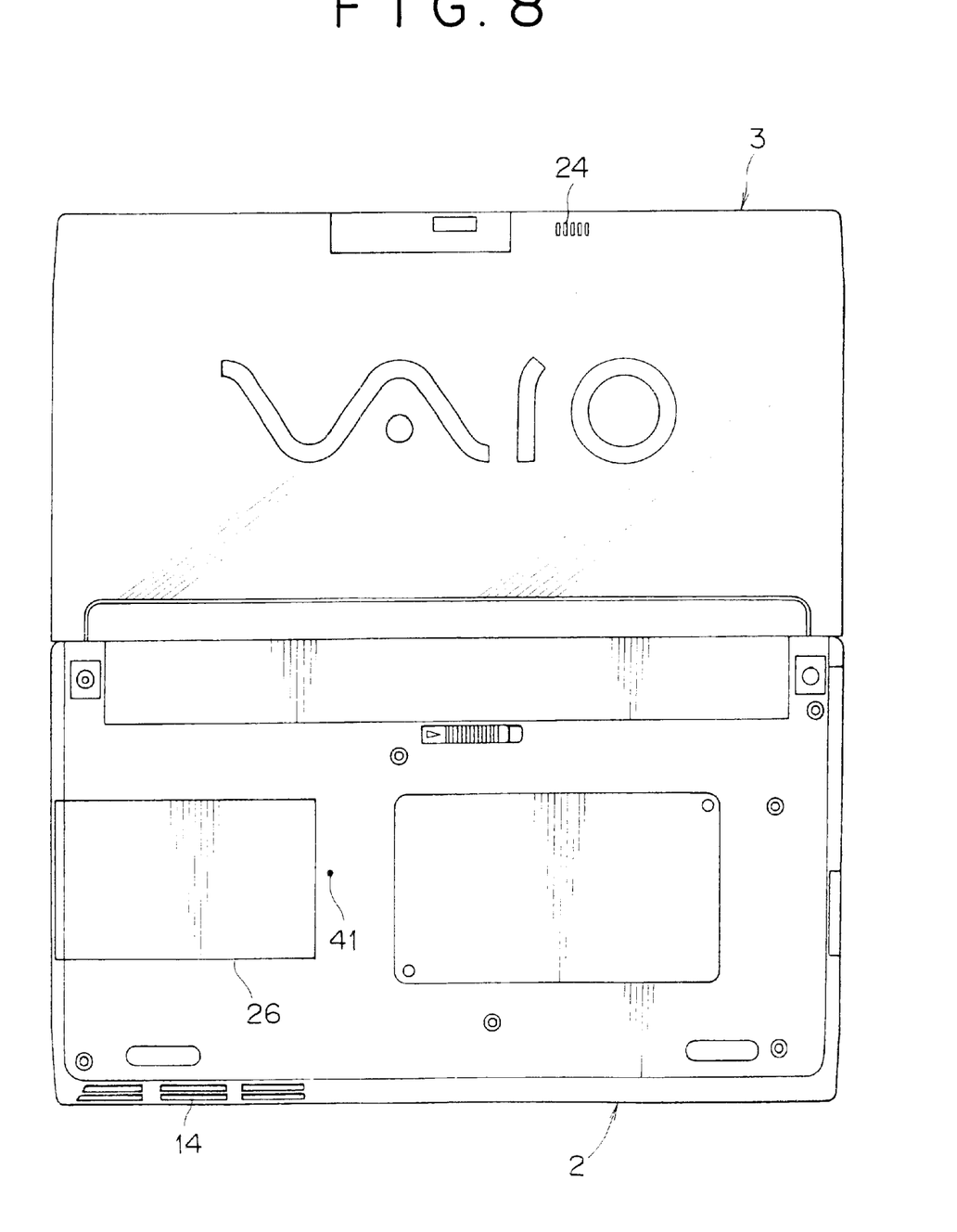
FIG. 8 is a bottom view of the computer in FIG. 6.

FIGS. 3 through 8 depict structures of a typical portable personal computer to which the invention is applied. The personal computer 1 is a mini-notebook type personal computer that primarily comprises a body 2 and a display part 3 attached swingingly to the body 2. FIG. 3 is a perspective view of the computer with the display part 3 swung open away from the body 2. FIG. 4 is a plan view of the computer in FIG. 3. FIG. 5 is a left-hand side view of the computer with the display part 3 swung shut onto the body 2. FIG. 6 is a right-hand side view of the computer with the display part 3 swung open 180 degrees relative to the body 2. FIG. 7 is a front view of the computer in FIG. 5. FIG. 8 is a bottom view of the computer in FIG. 6.

The face of the body 2 comprises a keyboard 4 and a stick type pointing device 5. The keyboard 4 is used to input characters, symbols, etc., and the stick type pointing device 5 is operated to move a mouse cursor. Also furnished on the body face are a speaker 8 for sound output and a shutter button 10 operated to take a picture using the CCD video camera 23 mounted on the display part 3.

A pawl 13 is provided at the upper end of the display part 3. As shown in FIG. 5, with the display part 3 swung closed onto the body 2, the pawl 13 hooks on to a hole 6 in the body 2. At the front of the body 2 is a slide lever 7 furnished in a crosswise movable fashion. The slide lever 7 is used to lock and unlock the pawl 13 so that the pawl 13 is engaged with and disengaged from the hole 6. With the pawl 13 unlocked, the display part 3 may be swung open away from the body 2. Adjacent to the pawl 13 is a microphone 24 which, as depicted in FIG. 8, may pick up sound not only from the front but also from the back side of the body 2.

The front of the body 2 further comprises a programmable power key (PPK) 9. An air outlet 11 is provided on the right-hand side of the body 2, as shown in FIG. 6. At the lower end in front of the body 2 is an air inlet 14 as depicted in FIG. 7. To the right of the air outlet 11 is a slot 12 that accommodates a PCMCIA (Personal Computer Memory Card International Association) card (called a PC card).

An LCD (liquid crystal display) 21 for displaying images is provided on the front of the display part 3. At the upper end of the LCD 21 is an image pickup part 22 mounted rotatably on the display part 3. More specifically, the image pickup part 22 is rotatable to any position within a range of 180 degrees in the same direction as the LCD 21 and in the opposite direction thereof (i.e., toward the back). The image pickup part 22 is furnished with the CCD video camera 23.

At the lower end of the display part 3 on the body side is a group of lamps including a power lamp PL, a battery lamp BL, a message lamp ML and other LEDs. Reference numeral 40 in FIG. 5 denotes a power switch furnished on the left-hand side of the body 2, and reference numeral 25 in FIG. 7 represents an adjusting ring used to adjust the focus of the CCD video camera 23. Reference numeral 26 in FIG. 8 stands for a cover that conceals an opening through which to install an additional memory into the body 2, and reference numeral 41 denotes a hole through which to insert a pin to unlock the cover 26.

Figure 9:
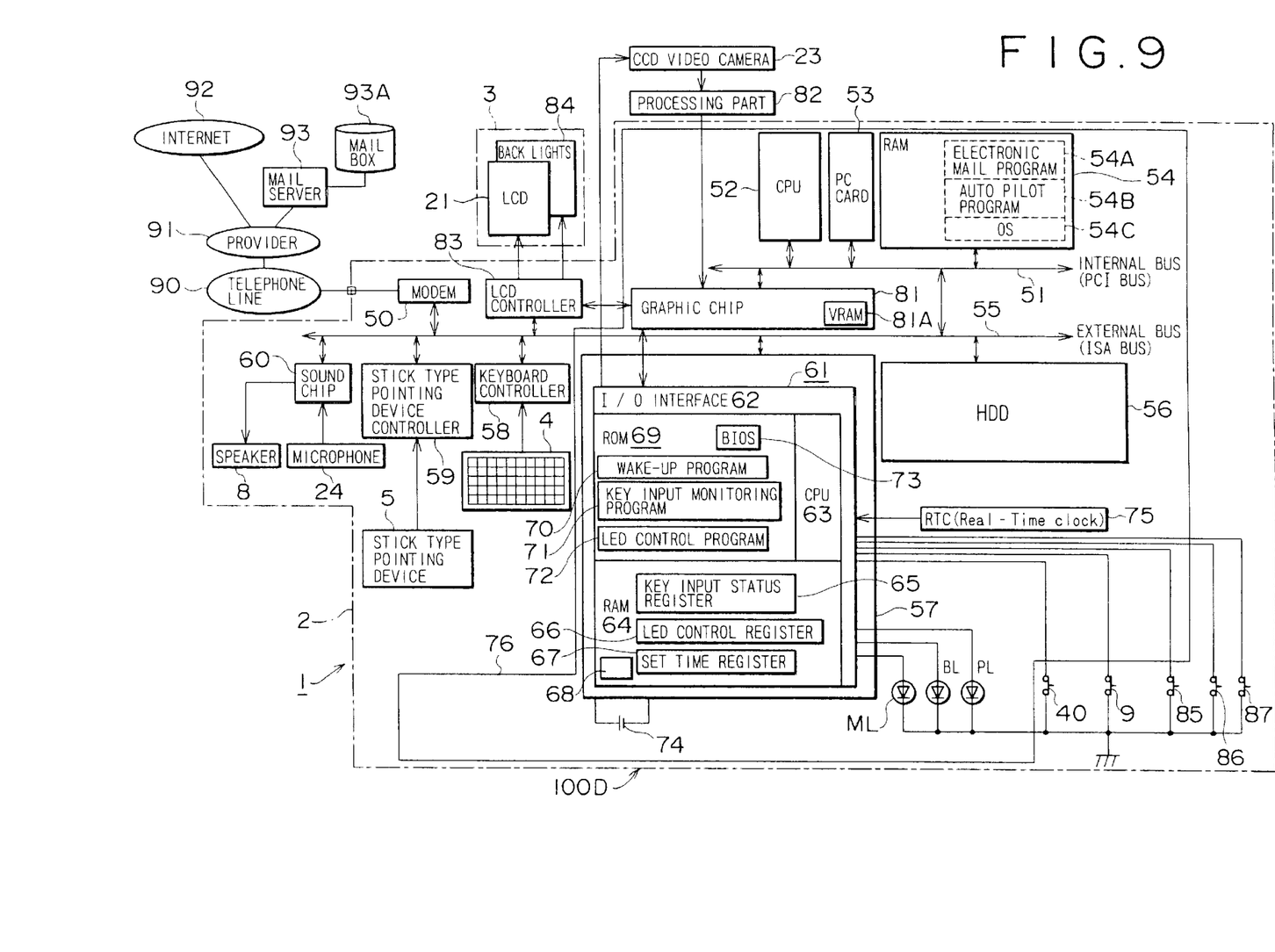
FIG. 9 is a block diagram showing an internal structure of the personal computer 1 in FIG. 3.

FIG. 9 illustrates an internal structure of the personal computer 1. An internal bus 51 is connected to a CPU (central processing unit) 52, a PC card 53 inserted as needed, a RAM (random access memory) 54, and a graphic chip 81. The internal bus 51 is coupled to an external bus 55. The external bus 55, for its part, is connected to a hard disk drive (HDD) 56, an I/O (input/output) controller 57, a keyboard controller 58, a stick type pointing device controller 59, a sound chip 60, an LCD controller 83, and a modem 50.

The CPU 52 is a controller that controls diverse computer functions. The PC card 53 is installed as needed when an optional function is to be added.

Image data captured by the CCD video camera 23 are forwarded to a processing part 82 for processing. The image data processed by the processing part 82 are input to the graphic chip 81. The graphic chip 81 stores the input video data into an internal VRAM 81A, and retrieves the data from the memory as needed for output to the LCD controller 83. Given the image data from the graphic chip 81, the LCD controller 83 outputs the data to the LCD 21 for display. Back lights 84 are provided to illuminate the LCD 21 from the back.

When the personal computer 1 is booted up, an electronic mail program (an application program) 54A, an auto pilot program (another application program) 54B and the OS (operating program) 54C are transferred from the HDD 56 to the RAM 54 and retained therein.

The electronic mail program 54A is a program that exchanges communication messages with an external entity using a communication line such as a telephone line and by way of a network. A received mail acquisition function is specifically included in the electronic mail program 54A. The received mail acquisition function checks a mail server 93 to see if a mail box 93A therein contains any mail addressed to this program (i.e., to the user). If any such mail is found in the mail box 93A, the received mail acquisition function carries out a suitable process to acquire that mail.

The auto pilot program 54B is a program that starts up and carries out a plurality of predetermined processes (or programs) in a predetermined sequence.

The OS (operating system) 54C controls basic computer functions. Typical operating systems are Windows 95 (registered trademark), Windows 98 (registered trademarks), and the like.

Figure 10:
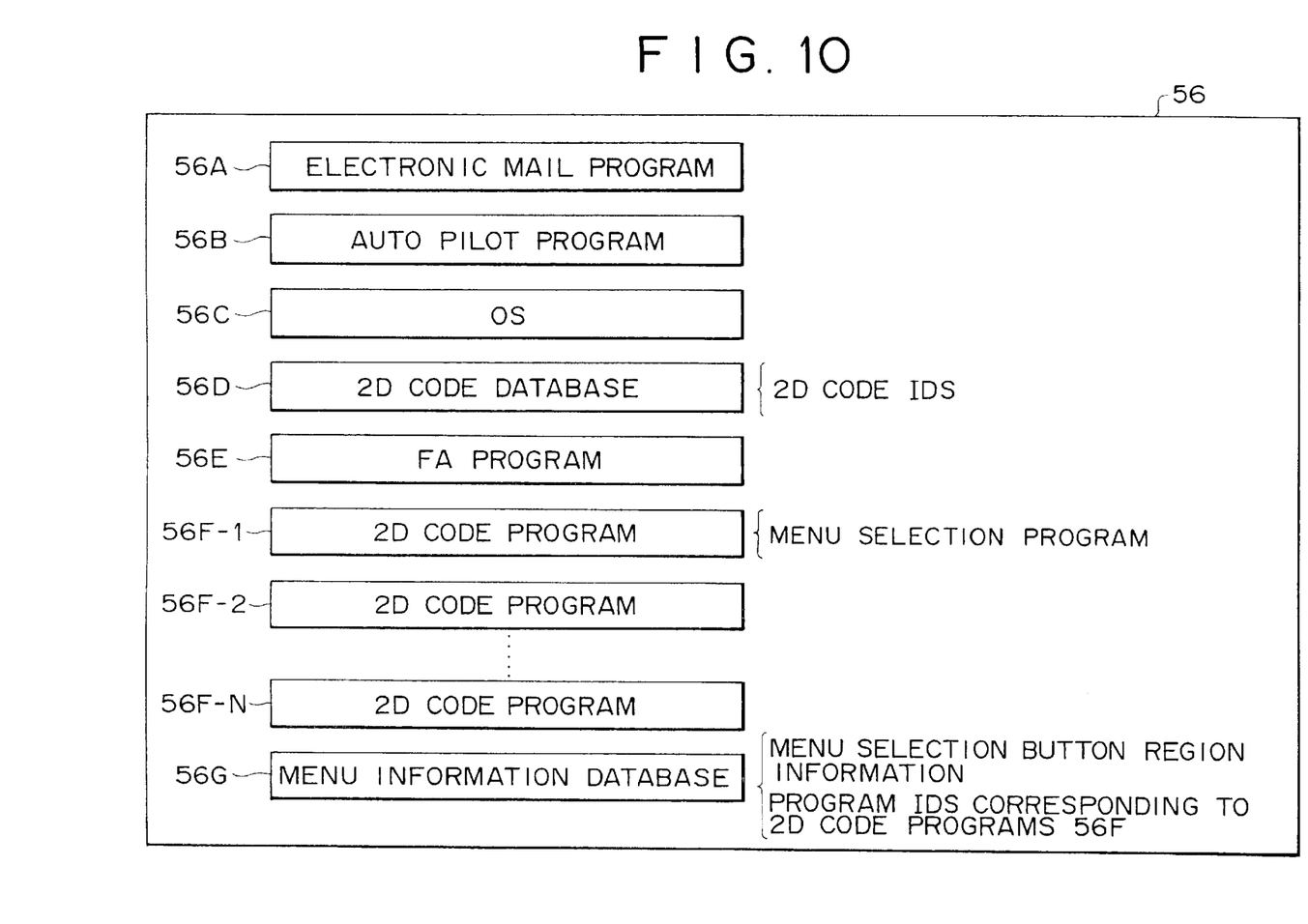
FIG. 10 is a schematic view indicating a structure of an HDD 56 in FIG. 9.

Meanwhile, as shown in FIG. 10, the hard disk drive (HDD) 56 connected to the external bus 55 contains the electronic mail program 56A, auto pilot program 56B, OS (operating system) 56C, a two-dimensional code database (called the 2D code database hereunder) 56D, a finder application program (called the FA program hereunder) 56E, N two-dimensional code associated application programs (called the 2D code programs hereunder) 56F-1 through 56F-N (the programs may be generically referred to as the 2D code program 56F if distinction between the individual programs is unnecessary), and a 2D code program menu information database (called the menu information database hereunder) 56G.

The 2D code database 56D stores identification numbers of two-dimensional codes (called 2D code IDs) attached to previously registered menu selection cards, such as 2D code IDs of the 2D codes 101.

The FA program 56E illustratively carries out a two-dimensional code extracting process whereby image data representing a given two-dimensional code are extracted from the image data held in the VRAM 81A of the graphic chip 81. The FA program 56E also performs a remote pointing process (described later) to start the corresponding 2D code program 56F accordingly. The FA program 56E has an API (application programming interface) that is used to call the 2D code program 56F and to exchange various messages.

The 2D code programs 56F-1 through 56F-N are application programs that are started by the FA program 56E. The 2D code programs 56F are capable of exchanging data with the FA program 56E through the API of the latter. Among these 2D code programs 56F, the program 56F-1 comprises a menu selection program for displaying menu selection buttons and a pointing cursor, to be described later.

The menu information database 56G holds information about positions (regions) of displayed menu selection buttons. The database 56G also retains program IDs of the 2D code programs 56F to be started corresponding to a selected menu selection button, as well as programs IDs. identifying general application programs such as a word processor.

During the booting process, the OS 56C, auto pilot program 56B and electronic mail program 56A are transferred successively from the hard disk drive 56 to the RAM 54 and stored in that memory.

Returning to FIG. 9, the I/O controller 57 has a microcontroller 61 equipped with an I/O interface 62. The microcontroller 61 is constituted by the I/O interface 62, a CPU 63, a RAM 64 and a ROM 69 which are interconnected. The RAM 64 includes a key input status register 65, an LED (light-emitting diode) control register 66, a set time register 67, and a register 68. The set time register 67 is used to start the operation of a start sequence controller 76 when a time preset by the user (i.e., starting condition) is reached. The register 68 holds a correspondence between a preset combination of operation keys (starting condition) on the one hand and an application program to be started on the other hand. When the user inputs the preset combination of operation keys, the corresponding application program (e.g., electronic mail program) is started.

When the fingertip-operated programmable power key (PPK) 9 is pushed, the key input status register 65 gets and retains an operation key flag. The LED control register 66 is used to control the illumination of the message lamp ML indicating that boot-up status of an application program (e.g., electronic mail program) which is held in the register 68. A desired time of day may be set to the set time register 67.

The microcontroller 61 is connected to a backup battery 74. The battery 74 allows contents of the registers 65, 66 and 67 to be retained when power to the body 2 is turned off.

The ROM 69 in the microcontroller 61 contains in advance a wake-up program 70, a key input monitoring program 71 and an LED control program 72. The ROM 69 is illustratively composed of an EEPROM (electrically erasable and programmable read only memory). The EEPROM is also called a flash memory. The microcontroller 61 is connected to an RTC (real-time clock) 75 that keeps the current time.

The wake-up program 70 in the ROM 69 is a program that checks to see if a preset time in the set time register 67 is reached on the basis of time-of-day data from the RTC 75. When the preset time is reached, the wake-up program 70 starts up a predetermined process (or program). The key input monitoring program 71 continuously monitors whether the PPK 9 is pushed by the user. The LED control program 72 controls the lighting of the message lamp ML.

Furthermore, the ROM 69 contains a BIOS (basic input/output system) 73. The BIOS is a software program that controls exchanges of data (input and output) between the OS or application software on the one hand and peripheral devices (e.g., display part, keyboard, hard disk drive) on the other hand.

The keyboard controller 58 connected to the external bus 55 controls input from the keyboard 4. The stick type pointing device controller 59 controls input from the stick type pointing device 5.

The sound chip 60 receives input from the microphone 24, and supplies sound signals to the built-in speaker 8.

The modem 50 permits connection to a communication network such as the Internet 92 and to the mail server 93 through a public telephone line 90 and an Internet service provider 91.

The power switch 40 is operated to turn on and off the power supply. A half-push switch 85 is activated when the shutter button 10 is half-pushed. A full-push switch 86 is turned on when the shutter button 10 is fully pushed. A reverse switch 87 is turned on when the image pickup part 22 is rotated by 180 degrees (i.e., when the CCD video camera 23 is rotated into a direction suitable for picking up an image on the opposite side of the LCD 21).

Figure 11:
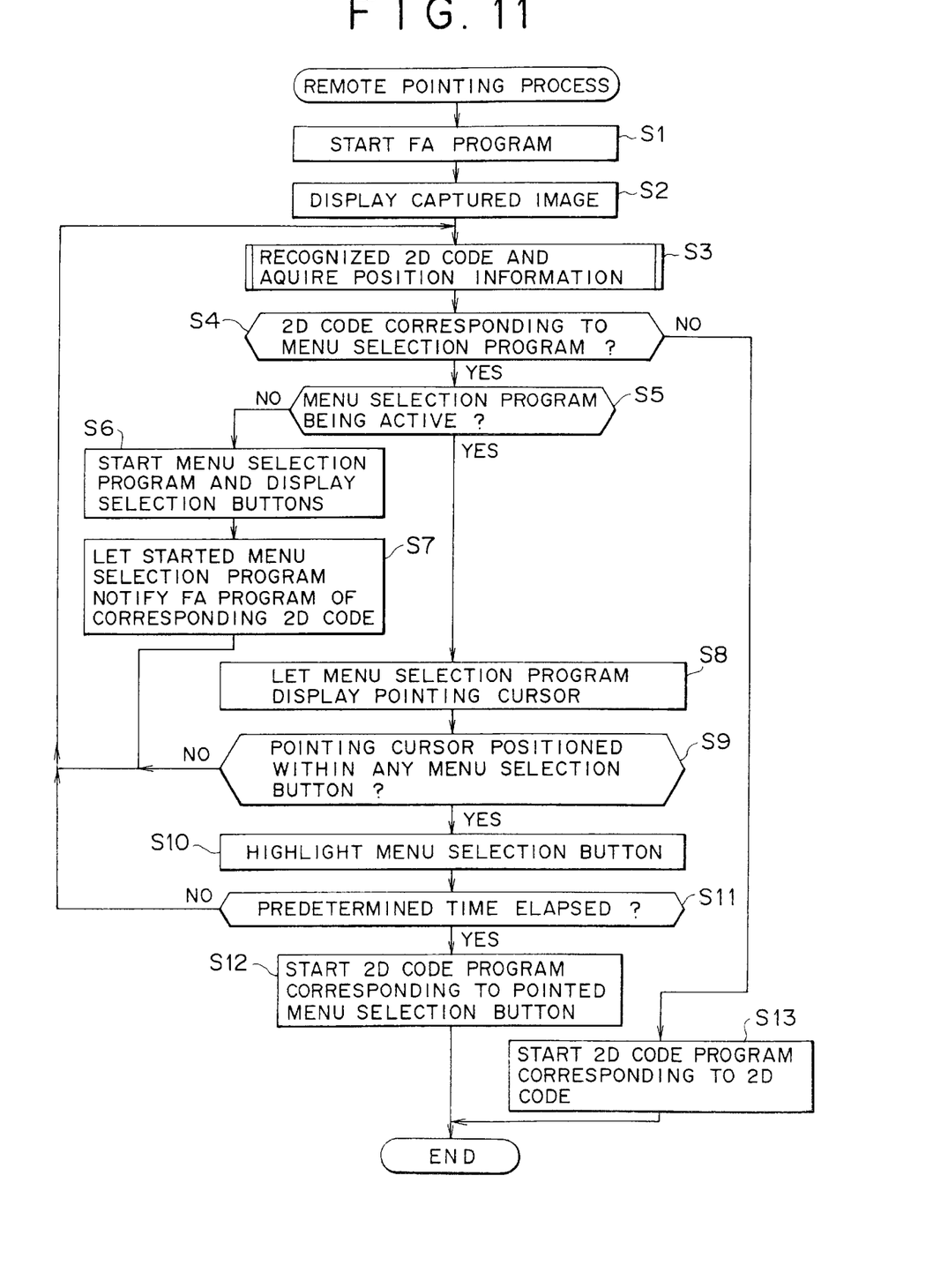
FIG. 11 is a flowchart of steps constituting a remote pointing process.

Described below with reference to the flowchart of FIG. 11 are steps in which the FA program 56E carries out the remote pointing process in conjunction with the 2D code program 56F-1 (menu selection program).

Figure 12:
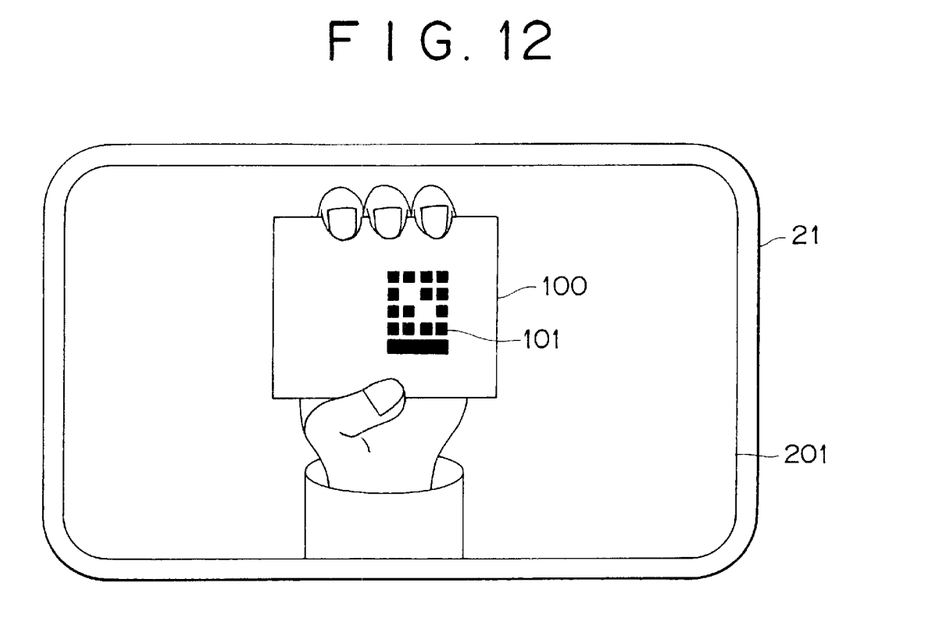
FIG. 12 is a schematic view sketching a typical display on an LCD 21 in FIG. 3.

The FA program 56E is first started from the HDD 56. In step S1, the FA program 56E executed by the CPU 52 acquires an image captured by the CCD video camera 23. In step S2, the FA program 56E causes the processing part 82 to process data representing the captured image, writes the processed image data to the VRAM 81A of the graphic chip 81, and controls the LCD controller 83 so as to display the captured image on a finder screen 201 of the LCD 21 as shown in FIG. 12. In the description that follows, the whole process in which the FA program 56E causes the LCD controller 83 to display an image on the finder screen 201 of the LCD 21 will be simply described as the FA program 56E itself displaying the image on the finder screen 201.

In step S3, the FA program 56E extracts and recognizes a 2D code 101 from the image data representing the object image acquired by the CCD video camera 23 in step S1. At the same time, the FA program 56E recognizes position information on the 2D code 101 relative to the object image displayed on the finder screen 201 (e.g., central point of the 2D code 101). In the example of FIG. 12, a 2D code 101 is extracted from an image of a menu selection card 100 captured by the CCD video camera 23. The position and a 2D code ID of the 2D code 101 in question are captured, and information about the captured position is acquired. After the FA program 56E has recognized the 2D code ID of the 2D code 101 and acquired its captured position information in step S3, step S4 is reached.

In step S4, a search is made through the 2D code database 56D to see if the 2D code ID recognized in step S3 matches a 2D code established beforehand in connection with the menu selection program (2D code program 56F-1). If the 2D code ID in question is judged in step S4 to match the predetermined 2D code, step S5 is reached.

In step S5, a check is made to see if the menu selection program (2D code program 56F-1) is being active. If the program is not judged to be active, step S6 is reached.

Figure 13:
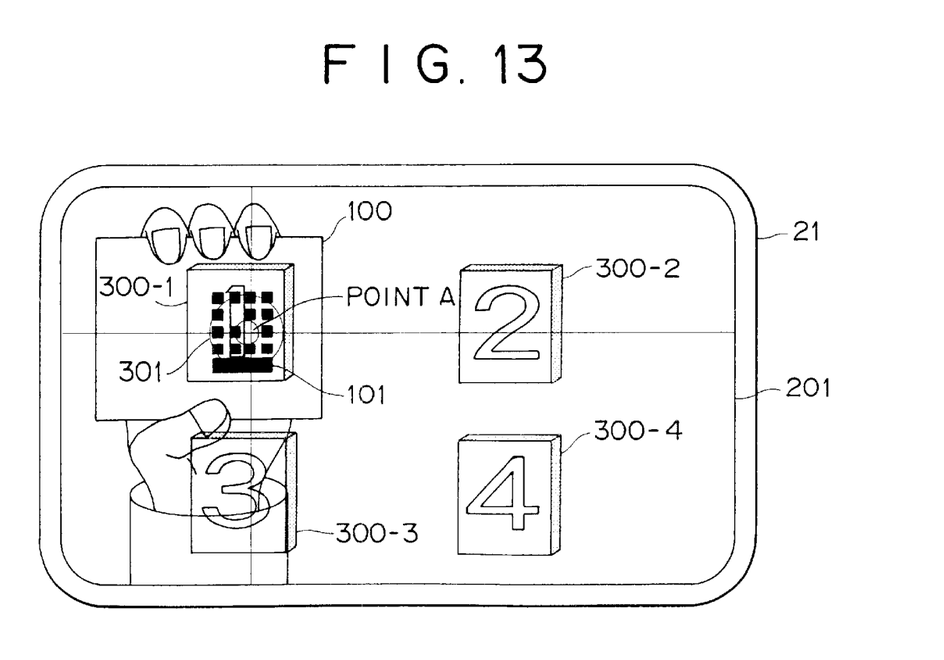
FIG. 13 is a schematic view depicting another typical display on the LCD 21 in FIG. 3.

In step S6, the menu selection program (2D code program 56F-1) is started. Then the menu selection program executed by the CPU 52 searches the menu information database 56G for a menu image comprising suitable selection buttons, and displays the retrieved menu image in overlaid relation to the captured image displayed in step S2. Illustratively, the menu image appears on the finder screen 201 as shown in FIG. 13. Information about regions representing four menu selection buttons 300-1 through 300-4 is retrieved from the menu information database 56G, and the buttons are displayed on the basis of the retrieved region information.

Step S6 is followed by step S7 in which the FA program 56E receives the relevant 2D code ID from the menu selection program thus started. Step S7 is followed by step S3.

If in step S5 the menu selection program is judged to be already active, step S8 is reached. In step S8, the menu selection program (2D code program 56F-1) displays a pointing cursor (shown in FIG. 13; simply called the cursor hereunder) 301 corresponding to the captured position information on the 2D code 101 recognized in step S3. In the example of FIG. 13, the cursor 301 has a point A located at the center of the 2D code 101, the point A being encircled by two concentric circles. Two lines are shown crossing the point A, one paralleling the X-axis of the finder screen 201, the other in parallel with the Y-axis of the screen 201.

In step S9, the menu selection program (2D code program 56F-1) checks to see if the position pointed to by the cursor 301 in step S8 (e.g., point A of the cursor 301) points to any one of the menu selection buttons 300-1 through 300-4. If the point A of the cursor 301 is judged to be positioned in a region of the menu selection button 300-i (i=1 in the example of FIG. 13) as shown in FIG. 13, step S10 is reached. For the description that follows, it is assumed that the point A of the cursor 301 points to the menu selection button 300-i as illustrated in FIG. 13.

Figure 14:
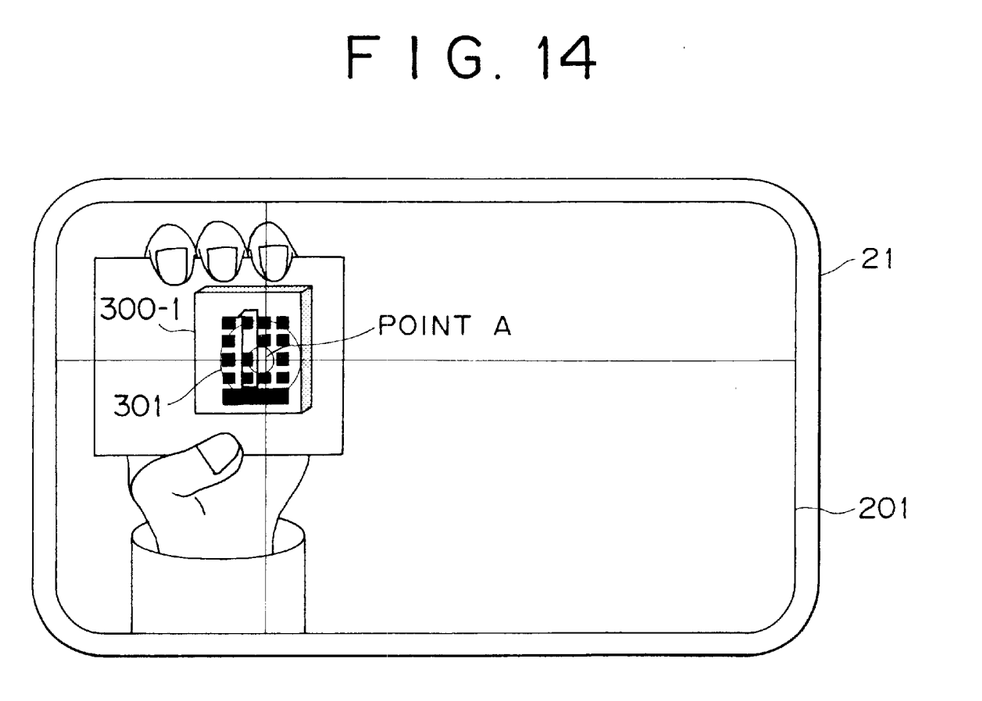
FIG. 14 is a schematic view illustrating another typical display on the LCD 21 in FIG. 3.

In step S10, the menu selection program (2D code program 56F-1) permits display of only the menu selection button 300-1 pointed to by the cursor 301 (i.e., the button highlighted) as shown in FIG. 14. The user is thus informed of the current selection of the menu selection button 300-1.

In step S11, the menu selection program (2D code program 56F-1) counts the time during which the cursor 301 is pointing to the menu selection button 300-i. If the menu selection button 300-i is judged to have been pointed to in excess of a predetermined period of time, the program goes to step S12.

Step S12 can be reached solely upon elapse of at least a predetermined period of time during which the cursor 301 has kept pointing to the menu selection button 300-i. This arrangement prevents a subsequent process from being carried out inadvertently with the cursor judged to be pointing to a different menu selection button 300-i while the presented position of the menu selection card 100 has yet to be fixed.

If in step S11 the cursor 301 is judged to have pointed to the menu selection button 300-i in excess of a predetermined period of time, the menu selection program (2D code program 56F-1) goes to step S12 in which the program searches the menu information database 56G for a program ID held corresponding to the region information about the menu selection button 300-i pointed to by the cursor 301. When a program ID is retrieved, the 2D code program 56F or a general application program such as a word processor corresponding to the retrieved program ID is started. Thereafter the process of FIG. 11 is terminated.

If in step S4 the FA program 56E, following the search through the 2D code database 56D, judges that the 2D code ID recognized in step S3 does not correspond to the previously established 2D code, then step S13 is reached. In step S13, a 2D code program 56F other than the menu selection program or a general application program such as a word processor having the program ID in question is started. Thereafter the process of FIG. 11 is terminated.

If in step S9 the cursor 301 is not judged to be pointing to the menu selection button 300-i, or if the cursor 301 is not judged in step S11 to have pointed to the menu selection button 300-i in excess of a predetermined period of time, then step S3 is reached again. Step S3 and subsequent steps are then repeated.

As described, when the cursor 301 at the relevant displayed position of a 2D code 101 is arranged to point to a menu selection button 300 for a certain period of time, the process corresponding to the button 300 is carried out without operation of the keyboard or mouse at all.

A computer program designed to perform the above-described processes may be retained on such package media as floppy disks, CD-ROMs and DVDs; on semiconductor memories, magnetic disks and the like where the program is stored temporarily or permanently; on wired and wireless communication media such as local area networks, the Internet, digital satellite broadcasting networks; or in diverse communication interfaces such as routers and modems for transmitting or receiving the program offered by the foregoing media. Such media, networks, interfaces and other measures allow the program to be installed in computers for program execution. The image processing program storage medium as mentioned in this specification refers broadly to all such media, networks, interfaces and measures.

As described and according to the inventive image processing apparatus, image processing method, and image processing program storage medium described above, a predetermined image pattern is first captured from an acquired object image. Position information about the captured image pattern relative to the object image is then recognized. A menu image is displayed on the basis of the captured position information, and a previously related process is started accordingly. Specifically, the user's simple action of presenting a computer with a menu selection card with a suitable 2D code printed thereon causes the position of the 2D code to be captured. The captured position information is used as a basis for effecting remote operations such as menu selection and starting of an application program. This provides an easy-to-operate platform eliminating the need for complicated input operations done conventionally using the mouse and other input device.

As many apparently different embodiments of this invention may be made without departing from the spirit and scope thereof, it is to be understood that the invention is not limited to the specific embodiments thereof except as defined in the appended claims.

What is claimed is:

1. An image processing apparatus, comprising:

image acquiring means for acquiring an object image;

displaying means for displaying said object image acquired by said image acquiring means;

captured position information recognizing means for capturing a predetermined image pattern from within said object image acquired by said image acquiring means in order to recognize position information about said image pattern relative to said object image;

menu display controlling means for displaying a menu image in overlaid relation to said object image displayed by said displaying means in accordance with an outcome of the recognition by said captured position information recognizing means; and starting means for starting a previously related process based on said menu image displayed by said menu display controlling means as well as on said position information recognized by said captured position information recognizing means, wherein said captured position information recognizing means captures a visible code from within said object image acquired by said image acquiring means, and recognizes position information about an image pattern of said visible code relative to said object image, and wherein said starting means starts said process related to a cursor positioned on a display button overlaid on said captured visible code.

2. The image processing apparatus according to claim 1, wherein said captured position information recognizing means captures a two-dimensional code attached to an object from within said object image acquired by said image acquiring means, and recognizes position information about an image pattern of said two-dimensional code relative to said object image.

3. The image processing apparatus according to claim 1, wherein said menu display controlling means displays selection buttons as said menu image, and displays a pointing cursor in a position corresponding to said position information recognized by said captured position information recognizing means.

4. The image processing apparatus according to claim 3, wherein, if said pointing cursor is displayed in excess of a predetermined period of time inside a specific selection button region displayed by said menu display controlling means, then said starting means starts a process previously related to said specific selection button.

5. An image processing method comprising the steps of:

acquiring an object image;

displaying said object image acquired in said image acquiring step;

recognizing position information about a predetermined image pattern relative to said object image by capturing said image pattern from within said object image acquired in said image acquiring step;

controlling display of a menu image in overlaid relation to said object image displayed in said displaying step in accordance with an outcome of the recognition in said captured position information recognizing step; and starting a previously related process based on said menu image displayed by said menu display controlling step as well as on said position information recognized in said captured position information recognizing step, wherein said captured position information recognizing step captures a visible code from within said object image acquired in said image acquiring step, and recognizes position information about an image pattern of said visible code relative to said object image, and wherein said starting means starts said process related to a cursor positioned on a display button overlaid on said captured visible code.

6. An image processing program storage medium for storing an image processing program in a manner executable by a computer, said image processing program comprising the steps of:

acquiring an object image;

displaying said object image acquired in said image acquiring step;

recognizing position information about a predetermined image pattern relative to said object image by capturing said image pattern from within said object image acquired in said image acquiring step;

controlling display of a menu image in overlaid relation to said object image displayed in said displaying step in accordance with an outcome of the recognition in said captured position information recognizing step; and starting a previously related process based on said menu image displayed by said menu display controlling step as well as on said position information recognized in said captured position information recognizing step, wherein said captured position information recognizing step captures a visible code from within said object image acquired in said image acquiring step, and recognizes position information about an image pattern of said visible code relative to said object image, and wherein said starting means starts said process related to a cursor positioned on a display button overlaid on said captured visible code.

* * * * *